March 3, 1942. E. B. WHEELER 2,274,913
MEANS FOR PASSING CABLES AND THE LIKE THROUGH STRUCTURAL WALL MEMBERS
Filed Jan. 24, 1940
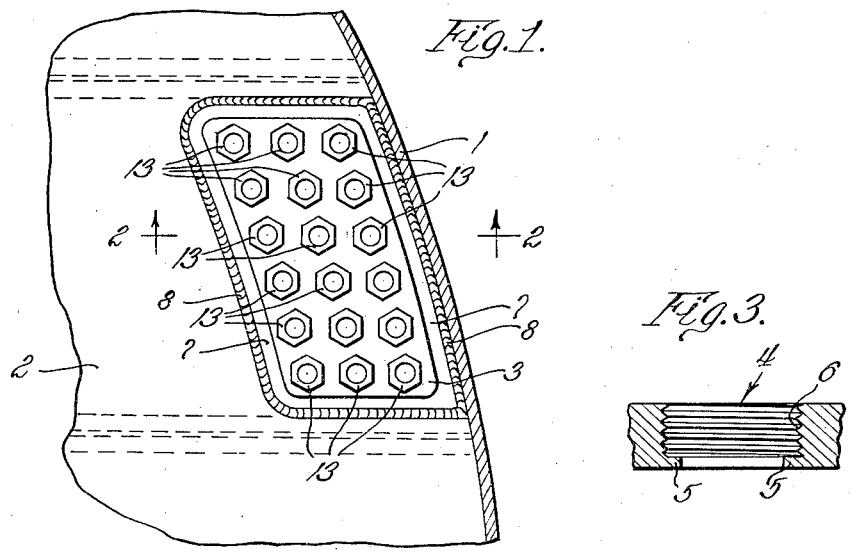
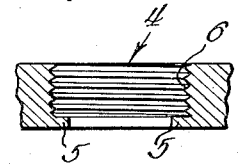
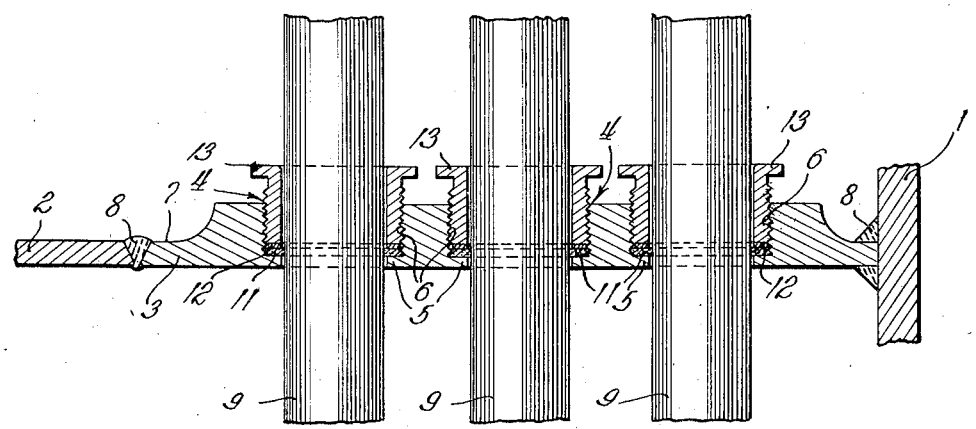
Inventor:
Edwin B. Wheeler
By Brown, Jackson, Boettcher & Dienner
Attys.

Patented Mar. 3, 1942

2,274,913

UNITED STATES PATENT OFFICE 2,274,913

MEANS FOR PASSING CABLES AND THE LIKE THROUGH STRUCTURAL WALL MEMBERS

Edwin B. Wheeler, New London, Conn., assignor to Electric Boat Company, Groton, Conn., a corporation of New Jersey Application January 24, 1940, Serial No. 315,299

2 Claims. (Cl. 114—65)

The present invention relates to an improvement in means for passing electric cables, rounds, and pipes or the like through flats, inner hulls and bulkheads or the like of a vessel in fluid-tight relation therewith.

It has been the practice, heretofore, whenever electric cables are to be lead through water-tight bulkheads and the like, to group the cables together and weld an individual stuffing tube for each cable to the bulkhead. After the stuffing tubes have been welded to the bulkhead it is then erected upon the ship. This method has many disadvantages and causes delay in the building of a ship in that the details of design of the ship and the cable layout therefor must be completed so that the individual stuffing tubes may be welded to the bulkheads, etc., prior to erection thereof upon the ship.

According to the present invention, the bulkheads or other structural members may be erected upon the ship before the cable layout is completed. Suitable areas of these members, which are erected without the individual stuffing tubes of the prior art, may be reserved for cables and the like. A plate corresponding to each reserved area is provided and, after the exact grouping, size and number of cables to be passed through that plate has been determined, the plate is provided with a corresponding number of properly arranged apertures. This plate is machine finished in the shop and then taken to the ship, the area reserved for that plate is then cut out of the bulkhead or other structural member, in which the plate is then welded. The cables are lead through the apertures in the plate, which is provided with suitable means for effecting a fluid-tight and pressure resistant closure about the respective cables.

My invention, in addition to affording the designing department ample time for designing the cable layout without delaying the construction of the vessel, has many other advantages. I have found that a great saving in cost and weight over the old method, both in manufacturing and installation, is effected, which is an important consideration. The use of the invention results in a more compact nesting of the cable banks and facilitates alteration of cable runs when a ship is being remodeled to delete or to add cables.

The present invention is directed to improved means for passing one or more cables or the like through bulkheads or like structural members in fluid-tight relation therewith, enabling cables or rounds to be simply and economically installed in a vessel. Other objects and advantages of my invention will appear from the detailed description of my invention.

In the drawing:

Figure 1 is a fragmentary vertical sectional view of a ship's hull, such as the hull of a submarine, showing my invention applied to a bulkhead thereof, with the cables omitted;

Figure 2 is a sectional view taken substantially on line 2—2 of Figure 1, with the cables shown fragmentarily and in plan; and Figure 3 is a detail vertical sectional view of a single threaded and seated aperture formed in the plate of my invention with the sealing means removed.

Referring now to Figure 1, I have shown fragmentarily a ship's hull 1 and a bulkhead 2 therein.

In practicing my invention the hull 1 of the ship may be laid and the construction thereof may be begun before the details of the cable layout is completed. Subsequently, when the designing department has determined the size, grouping and number of cables to be passed through bulkhead 2, a suitable area thereof is reserved for that purpose. A relatively thick metal plate 3, corresponding to the area of the bulkhead thus reserved, is provided with the proper number of appropriately arranged apertures 4 each of which is formed with an integral seat 5, at one side of the plate, and is interiorly threaded or tapped as at 6. The edge portion 7 of plate is 3 is machined down, from one face thereof, to substantially the same thickness as that of the bulkhead, and the edges of the plate preferably are beveled as shown. After the plate has been machine finished in the shop it is taken to the ship and the reserved area of the bulkhead is cut out, with the edges of the opening thus provided beveled oppositely to the edges of the plate and defining therewith, when the plate is properly positioned in the opening, a welding trough. The plate 3 is then welded to the bulkhead and, where necessary, to the hull, at 8, as shown. It will be obvious that the plate 3 may be disposed in any other required position in the bulkhead or other structural member. The cables 9 are then individually passed through apertures 4 and split packing rings 11 of suitable material are disposed about the respective cables and rest upon seat 5. Washers 12 are positioned over the packing rings 11 and screw glands 13 are then threaded into the apertures 4 and compress the packing rings between seats 5 and washers 12 into tight contact with the cables 9, thus forming fluid-tight joints between the cables and the plate 3. The washers 12 are not essential and may be omitted if desired.

While I have shown and disclosed what I consider to be the preferred embodiment of my invention, it is to be understood that various modifications may be made without departing from the spirit and scope thereof as defined by the appended claims.

I claim:

1. In submarine boat construction, a hull and a bulk-head therein, said bulkhead having a predetermined area thereof removed providing an opening therethrough substantially corresponding in area and location to the area to be occupied by cables to be passed through said bulkhead, a plate comprising a relatively thick body portion and a relatively thin marginal portion of substantially the same thickness as said bulkhead, said plate fitting in said opening with its marginal portion welded to said bulkhead, said body portion of said plate being provided with threaded and seated cable receiving apertures therethrough, cables passing through said apertures, packing material disposed in said apertures about the respective cables, and packing glands disposed about the respective cables threaded into said apertures and compressing therein said packing material.

2. In submarine boat construction, a hull and a bulkhead therein, said bulkhead having a predetermined area thereof removed providing an opening therethrough substantially corresponding in area and location to the area to be occupied by cables to be passed through said bulkhead, a plate comprising a relatively thick body portion and a relatively thin marginal portion of substantially the same thickness as said bulkhead, said plate fitting in said opening with its marginal portion welded to said bulkhead, said body portion of said plate being provided with threaded and seated cable receiving apertures therethrough, cables passing through said apertures, and means cooperating with said plate and said cables effective for providing individual fluid tight and pressure resistant closures about said cables.

EDWIN B. WHEELER.